Patented May 15, 1923.

1,455,397

UNITED STATES PATENT OFFICE.

HERMAN HEUSER, OF EVANSTON, ILLINOIS.

MANUFACTURE OF LOW-ALCOHOLIC BEVERAGES.

No Drawing.   Application filed January 12, 1920. Serial No. 350,954.

*To all whom it may concern:*

Be it known that I, HERMAN HEUSER, a citizen of the United States, residing at Evanston, in the county of Cook and State of Illinois, have invented a new and useful Improvement in the Manufacture of Low-Alcoholic Beverages, of which the following is a specification.

The present invention relates to the manufacture of beverages low in alcohol or substantially free therefrom, and which present the characteristics, flavor, taste, body and other distinguishing features of fermented alcoholic beverages, such as beer, ale, wine, etc. In will be clearly understood from the description thereof hereinafter given.

In the manufacture of beverages low in alcohol or substantially free therefrom having the characteristic properties of taste, flavor, body, etc., of natural fermented beverages, it has been proposed to remove the alcohol from such beverages by the application of heat. As a result of this removal of alcohol, however, there is a marked deterioration in taste, flavor, and other characteristics of the beverage, rendering it in many cases exceedingly unpleasant for use as a beverage. These changes are due not only to the loss with the alcohol of volatile alcohols, esters and acids which aid in giving to the original beverage its desirable qualities, but also to changes in character in the residue utilized for beverage purposes, such as caramelization of its carbohydrates, coagulation or destruction of its albumens and other nitrogenous bodies and other vital changes in the composition of the beverage.

In the process described in my previous Patent No. 1,302,551 of May 6, 1919, I have proposed to restore to the beverage produced by natural fermentation and subsequent dealcoholization a natural taste and flavor identical with or closely resembling that of a natural fermented beverage, and at the same time to remove from the residue the undesirable flavor produced therein by the process of dealcoholization by producing in the dealcoholized beverage a live yeast fermentation under conditions whereby the propagation of yeast is accelerated without increasing its fermentative action, namely, by permitting the carbondioxide generated to escape freely and subsequently artificially carbonating the beverage. By this means I have been able to produce a beverage for example, of the beer type, exceedingly low in alcohol (less than 0.5%) but nevertheless having the flavor and taste and other desirable qualities of the natural alcohol containing beverage in such measure as to make it difficult for persons other than the most expert in the art to detect the difference from the natural beverage by taste and flavor.

I have discovered that the characteristics of flavor, taste, palatability, zest, bouquet, etc., produced by the secondary yeast fermentation of the character described in the dealcoholized fermented beverage residue may be influenced and improved by varying the character of food products available for the yeast in the medium in which it is propagated. I have found that in the dealcoholized fermentation product which has been used as this medium, certain food elements are lacking which, if present, would influence the character of the propagation of yeast and also of the products produced thereby. For example, in dealcoholized beer, wherein complete fermentation has taken place and the yeast which produced this fermentation removed prior to dealcoholization, a considerable proportion of the natural nitrogenous constituents of the materials from which the beer has been produced are removed by the yeast in the original fermentation, and that remaining is to a large extent converted into insoluble or undesirable forms during the dealcoholization. Other changes take place in the carbohydrates and mineral constituents of the beer.

I have now discovered that the propagation of yeast in such a medium for the production of a natural fermented flavor and taste is promoted, and the formation of highly desirable flavor and taste imparting substances is likewise promoted by the addition to the dealcoholized beverage of certain nitrogenous substances in available form for utilization by the yeast. These substances having the desired properties are nitrogenous in character and are in general assimilable organic compounds of the character of amides or amino compounds that is, containing the amino group. These nitrogenous substances may be used in their commercial form or as constituents of substances which are particularly rich in amides or amino compounds, particularly amino-acids. Thus I may use asparagine or aspartic acid, or the juice expressed from asparagus or lettuce or like asparagine containing compounds. As I have found that amino acids are more active in the propagation of yeast under the conditions described herein, it is preferred that such materials be hydrolyzed in order to convert the asparagine as completely as possible into aspartic acid.

I may, however, utilize the higher amino compounds and more particularly those insoluble and assimilable compounds derived by the more or less complete degradation of proteins by enzyme action or chemical action, or by the action of the life process. Thus I may utilize the extracts derived from germination products of grains, such as malt sprouts or similar products.

I have likewise found that the yeast cells themselves provide a material containing amino compounds and amides which is of great efficiency in promoting the propagation of yeast with the production and flavors and bouquets desired in non-alcoholic fermented beverages. The contents of the cells may be extracted without substantial change in any suitable manner, for example, as in the form of Buchner's yeast juice, which is prepared by grinding a pasty mass of yeast with sand and kieselguhr and expressing the juice from the paste by filtration under a suitably high pressure, for example, 160 to 200 lbs. per square inch. Before this juice is used the zymase is preferably destroyed either by heating the juice to a temperature at which the zymase is killed, or by auto-digestion by the endotryptase contained in the juice. The juice thus treated, may then be utilized in connection with the dealcoholized beverage to aid in the propagation of the yeast therein.

It is preferred, however, that the cell contents of the yeast be made available for the further propagation of yeast either by rupturing the cell integuments or by the action of the endotryptase contained within the yeast itself. In the first place the yeast may be boiled for a sufficient length of time to effect the rupturing of the cell walls and the liberation of their contents. The boiling of the yeast may be carried out simultaneously with the dealcoholization of the primary fermented beverage, for example, by adding the desired amount of thick fluid pitching yeast to the beer during or just prior to dealcoholization. Thus, in the preparation of a beer-like beverage, a primary beer produced in the usual manner and from which the yeast has been removed, is treated with a suitable amount of pitching yeast either just prior to or while being boiled to effect its dealcoholization. A suitable amount of yeast to be added is 150 lbs. for each 100 barrels of the completed beverage. During the dealcoholization, which may be carried on at or near atmospheric pressure, the yeast cells are ruptured and their contents liberated and diffused through the mass of the dealcoholized beverage.

I may likewise utilize for this purpose the yeast which was employed for the first fermentation of the beer subjected to dealcoholization, for instance, that contained in the beer to be dealcoholized after fermentation without separation. Such yeast contains or has associated with it considerable of the hop flavoring material assimilated or absorbed from the hopped wort, and, if placed in the beer to be dealcoholized in the unwashed condition, imparts thereto an agreeable hop flavor.

The dealcoholized material containing the yeast cell contents is then brought back to its original volume by dilution and a yeast fermentation produced therein, preferably under the conditions described in my prior Patent No. 1,302,551, whereby a yeast propagation is promoted. That is, the carbon dioxide formed during the fermentation is permitted to pass off without effecting carbonation of the beverage, which is later carbonated artificially. As a result of the presence of the yeast cell contents in the beverage, this yeast propagation is further promoted by supplying to the yeast a form of food highly suited to it, and furthermore one which, as I have discovered, greatly accelerates and increases the formation of the desired bouquet, taste and flavor producing materials in the final beverage. The yeast cell contents added will also markedly aid the propagative action of the yeast even when the carbon dioxide is retained in the beverage during the secondary yeast fermentation.

Instead of making the yeast cell contents available by rupturing the yeast cells by heat, I may render the yeast cell contents available by enzyme action or digestion, preferably by autolysis of the yeast. For example, 150 lbs. of thick fluid pitching yeast, preferably washed, may be maintained at a temperature of approximately 122° F. being preferably occasionally agitated, and within about three days under such conditions it is completely autolysed by the action of the endotryptase of the yeast cells themselves. At this temperature the zymase is practically destroyed. In order that there may be a complete hydrolysis of the amides present in the autolyzed mass, a small amount of a suitable acid, for example 1% of acetic acid may be added to the autolysed yeast, which is then kept at a temperature of approximately 122° F. for an additional three to six hours, whereby hydrolysis of the acid amides is effected.

The autolysed yeast thus prepared, which has a very pronounced meaty odor, is added to a dealcoholized beer, the latter in quantity sufficient for the production of about 100 barrels of completed beverage. The treated dealcoholized beer likewise has the meaty odor of the autolysed yeast. I then add to the treated dealcoholized beverage a suitable quantity of yeast and of fermentable matter, for example 5–10%, of fermenting wort containing live yeast, as described in my prior Patent No. 1,302,551 previously referred to. The yeast fermentation produced is preferably carried on with elimination of the carbon dioxide formed, propagation of the yeast to its fullest extent being thereby promoted. During this fermentation the meaty odor imparted to the dealcoholized beverage by the autolysed yeast gradually disappears, and the propagation of the yeast under these conditions produces the highly desirable flavor and bouquet imparting substances in the final beverage, which may contain less than 0.5% of alcohol. In fact, in this manner I have produced a beer-like beverage containing less than 0.2% of alcohol and having the full flavor, taste and bouquet of a true beer.

When simpler amino compounds, such as asparagine or asparatic acid, are utilized for aiding the desired flavor and bouquet producing propagation of yeast in the secondary fermentation, they may be added to the dealcoholized beverage in the proportions of approximately 30–40 grams of asparagine or about 30 grams of aspartic acid per barrel of completed beverage. The yeast fermentation is then produced therein, preferably without carbonating the beverage, as described in my patent previously referred to, and the beverage, after filtering is artificially carbonated.

This process is highly suitable for the manufacture of beer-like beverages, and in the specific examples above given its use in this connection has been described. It may likewise be utilized in the manufacture of wine and other fermented beverages derived from fruit juices, in which case it is desirable, for the production of a final product having the same flavor and bouquet as the original alcohol containing beverage that the yeast utilized both for the supply of the yeast food for the secondary yeast propagation and the yeast utilized in the secondary yeast propagation itself be of the same character as the yeast which produces the original fermentation. Thus in the manufacture of dealcoholized wine, it is preferred that wine yeast be utilized in the secondary yeast propagation, and that the yeast cell contents empolyed to control the propagation thereof be derived from wine yeast by rupturing the cells thereof or by autolysis. It is furthermore apparent that by varying the character of the dealcoholized primary fermented liquids and the yeast utilized for the production of flavor, bouquet, etc., therein, many desirable combinations of flavor or taste may be produced in the final beverage.

The specific examples recited herein are for the purpose of illustration and the theories advanced are intended to supply an explanation thereof, but are not intended to limit the process except in so far as included in the accompanying claims.

I claim:

1. The process of producing a low alcoholic beverage from a dealcoholized fermented beverage which consits in supplying in the dealcoholized beverage a nitrogenous yeast food which promotes flavor and taste producing yeast proparagtion, and producing a secondary limited yeast fermentation therein.

2. The process of producino a low alcoholic beverage from a dealcoholized fermented beverage which consists in supplying in the dealcholized beverage nitrogenous food compounds containing the amino group and producing a secondary limited yeast fermentation therein.

3. The process of producing a low alcoholic beverage from a dealcoholized fermented beverage which consists in supplying in the dealcoholized beverage amino acids and producing a secondary limited yeast fermentation therein.

4. The process of nroducing a low alcoholic beverage from a dealcoholized fermented beverage which consists in supplying in the dealcoholized beverage soluble proteins and producing a secondary limited yeast fermentation therein.

5. The process of producing a low alcoholic beverage from a dealcoholized fermented beverage which consists in supplying in the dealcoholized beverage yeast cell contents and producing a secondary limited yeast fermentation therein.

6. The process of producing a low alcoholic beverage from a dealcoholized fermented beverage which consists in supplying to the dealcoholized beverage predigested yeast cell contents and producing a secondary limited yeast fermentation therein.

7. The process of producing a low alcoholic beverage from a dealcoholized fermented beverage which consists in supplying to the dealcoholized beverage autolyzed yeast and producing a secondary limited yeast fermentation therein.

8. The process of producing a low alcoholic beverage from a dealcoholized fermented beverage which consists in supplying to the dealcoholized beverage heat ruptured yeast and producing a secondary limited yeast fermentation therein.

9. The process of producing a low alcoholic beverage from a dealcoholized fermented beverage which consists in adding autolyzed yeast to dealcoholized beer and also adding thereto fermenting wort and live yeast, producing a limited yeast fermentation without carbonating the beverage and subsequently artificially carbonating the beverage.

10. The process of producing a low alcoholic beverage from a dealcoholized fermented beverage which consists in supplying yeast to a fermented beer, boiling the beer to effect removal of the alcohol, thereby rupturing the yeast cells, producing in the beer a limited yeast fermentation without carbonating the beverage, and subsequently carbonating the beverage.

11. The process of producing a low alcoholic beverage from a dealcoholized fermented beverage which consists in supplying yeast containing assimilated and associated hop substances to a fermented beer, boiling the beer to effect removal of the alcohol, thereby rupturing the yeast cells, producing in the beer a limited yeast fermentation without carbonating the beverage, and subsequently carbonating the beverage.

12. The process of producing a low alcoholic beverage from a dealcoholized fermented beverage which consists in supplying yeast containing assimilated and associated hop substances to a fermented beer, boiling the beer to effect removal of the alcohol, thereby rupturing the yeast cells, producing in the beer a limited yeast fermentation without carbonating the beverage, and subsequently carbonating the beverage, the yeast being added in the proportion of about 150 pounds to 100 barrels of the completed beverage.

13. The process of producing a low alcoholic beverage from a dealcoholized fermented beverage which consists in adding autolyzed yeast to dealcoholized beer, producing therein a secondary limited yeast fermentation without carbonating the beverage, and subsequently carbonating the beverage, the autolyzed yeast being added in the proportion of the product from about 150 lbs. of yeast to 100 barrels of completed beverage.

14. The process of producing a low alcoholic beverage from a dealcoholized fermented beverage which consists in adding aspartic acid to dealcoholized beer, producing therein a secondary limited yeast fermentation without carbonating the beverage, and subsequently carbonating the beverage, aspartic acid being added in the proportions of about 30 grams per barrel of completed beverage.

15. The process of producing a low alcoholic beverage from a dealcoholized fermented beverage which consists in adding asparagine to dealcoholized beer, producing therein a secondary limited yeast fermentation without carbonating the beverage, and subsequently carbonating the beverage, asparagine being added in the proportions of 30–40 grams per barrel of completed beverage.

HERMAN HEUSER.